(12) United States Patent
Falkenstein (10) Patent No.: US 8,494,739 B2
(45) Date of Patent: Jul. 23, 2013

(54) SLIP OPERATION OF A CLUTCH IN HYBRID DRIVE DEVICES

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 12/736,369

(22) PCT Filed: Mar. 24, 2009

(86) PCT No.: PCT/EP2009/053442
§ 371 (c)(1),
(2), (4) Date: Dec. 28, 2010

(87) PCT Pub. No.: WO2009/127502
PCT Pub. Date: Oct. 22, 2009

(65) Prior Publication Data
US 2011/0093146 A1  Apr. 21, 2011

(30) Foreign Application Priority Data
Apr. 14, 2008 (DE) .......................... 10 2008 001 144

(51) Int. Cl.
*B60W 10/02* (2006.01)
*B60K 6/387* (2007.10)

(52) U.S. Cl.
USPC .................... 701/67; 701/22; 903/914; 477/5

(58) Field of Classification Search
USPC ........................................................ 701/22
See application file for complete search history.

(56) References Cited

U.S. PATENT DOCUMENTS

| | | | |
|---|---|---|---|
| 1,892,295 A * | 12/1932 | Walker | 73/862.17 |
| 5,722,502 A * | 3/1998 | Kubo | 180/65.23 |
| 6,061,619 A * | 5/2000 | Schmitz et al. | 701/51 |
| 6,102,144 A | 8/2000 | Lutz | |
| 6,516,255 B2 * | 2/2003 | Jager et al. | 701/29.2 |
| 7,131,933 B2 * | 11/2006 | Tabata | 477/181 |
| 7,690,457 B2 * | 4/2010 | Nakanowatari | 180/65.265 |
| 7,953,538 B2 * | 5/2011 | Matsubara et al. | 701/99 |
| 2002/0148700 A1 | 10/2002 | Dominke et al. | |
| 2003/0109357 A1 * | 6/2003 | Tabata | 477/109 |
| 2005/0051371 A1 * | 3/2005 | Masterson | 180/65.2 |
| 2008/0017427 A1 * | 1/2008 | Nakanowatari | 180/65.2 |
| 2008/0114522 A1 * | 5/2008 | Matsubara et al. | 701/99 |

FOREIGN PATENT DOCUMENTS

| | | |
|---|---|---|
| DE | 197 21 298 | 11/1998 |
| DE | 199 15 207 | 10/2000 |
| DE | 100 53 110 | 5/2002 |
| DE | 102 04 981 | 8/2003 |
| DE | 103 08 692 | 9/2003 |
| DE | 10 2006 042922 | 4/2008 |
| JP | 11-44229 | 2/1999 |
| JP | 2000-326762 | 11/2000 |
| JP | 2000326726 | 11/2000 |
| JP | 2001-218305 | 8/2001 |
| JP | 2002-181086 | 6/2002 |
| JP | 2006-52833 | 2/2006 |
| WO | WO 03/074312 | 9/2003 |

* cited by examiner

*Primary Examiner* — Thomas Tarcza
*Assistant Examiner* — Shelley Chen
(74) *Attorney, Agent, or Firm* — Kenyon & Kenyon LLP (57) ABSTRACT

A method for operating a hybrid drive device of a motor vehicle that has at least two different drive aggregates, in particular an electric motor and an internal combustion engine, and having a clutch, the drive aggregates being capable of being operatively connected using the clutch. It is provided that, in a diagnostic and/or adaptation operating mode; the clutch is operated with a slippage. In addition, the present system relates to a hybrid drive device, a control device for a hybrid drive device, and a motor vehicle aggregate that has both the control device and the hybrid drive device.

17 Claims, 6 Drawing Sheets

SLIP OPERATION OF A CLUTCH IN HYBRID DRIVE DEVICES

FIELD OF THE INVENTION

The present invention relates to a method for operating a hybrid drive device of a motor vehicle having at least two different drive aggregates, in particular an electric motor and an internal combustion engine, and having a clutch, the drive aggregates being capable of being operatively connected using the clutch. The present invention also relates to a corresponding device.

BACKGROUND INFORMATION

In hybrid motor vehicles, the drive train is generally made up of an internal combustion engine and at least one electric motor. In a parallel hybrid drive train, the internal combustion engine can be coupled to the electric motor via a clutch that can be influenced by a control device. In addition to the operating modes hybrid driving, boost operation, and recuperation mode, an operating mode also results from this that enables purely electrical driving. A starting of the internal combustion engine can for example be required during electrical driving mode if the driver requires more drive power than the electric motor is able to produce, or if the energy content of an electrical energy storage device for the electric motor decreases too strongly. This starting usually takes place through a tow-starting of the internal combustion engine by the electric motor. The internal combustion engine and the electric motor represent two sources of torque that, when the clutch is closed, together produce an overall drive torque referred to as hybrid driving mode. It is not always possible to clearly determine whether, after tow-starting by the electric motor, the internal combustion engine has started without error, i.e. whether combustions are taking place. In particular given low torque requirements on the internal combustion engine, this cannot be determined reliably from the signals that are typically available, e.g. from control devices. A measurement of the torque produced by the internal combustion engine, or of the overall drive torque produced together by the internal combustion engine and the electric motor, usually does not take place for reasons of cost.

SUMMARY OF THE INVENTION

On the basis of the method according to the present invention, it is provided that the clutch is operated with slippage in a diagnostic and/or adaptation operating mode.

The slippage partially decouples the drive aggregates from one another, and is distinguished by a difference in rotational speed at the clutch, i.e., in that, despite an operative connection with a transmission of torques to one another, the drive aggregates can assume rotational speeds that are different from one another and are varying. The rotational speeds of the drive aggregates are a function of the torques present at and/or produced at the drive aggregates, for which reason an independent increase in the rotational speed of a drive aggregate indicates a production of torque of this drive aggregate, as is the case during a starting process of an internal combustion engine.

Diagnostic operating mode is provided in particular in order to recognize error-free operation of the drive aggregates by monitoring their rotational speeds, and of the clutch by monitoring its rotational speed difference, and to diagnose errors in the operation of the corresponding components of the hybrid drive device in the same manner. In addition, adaptation mode is intended to enable adaptation of the operating states of the individual components in a desired manner by specifying a rotational speed for one of the drive aggregates, and/or a rotational speed difference, and thus the slippage, at the clutch, whereby torques can be set at the drive aggregates. In this way, the production of torque can be qualitatively determined and/or specified.

According to an advantageous development of the exemplary embodiments and/or exemplary methods of the present invention, it is provided that the slippage is controlled and/or regulated. Through the controlling and/or regulation in particular of a pressure force of a control device of the clutch that closes or opens the clutch, the slippage can be set to a particular defined value. This defined value can be used as a reference point for the diagnosis and/or adaptation of the operating states of individual components and/or of the hybrid drive device as a whole. In this way, the diagnosis and/or adaptation is optimized, because the monitoring and/or specification of the rotational speed can take place not only qualitatively but also quantitatively.

According to a development of the exemplary embodiments and/or exemplary methods of the present invention, it is provided that the slippage is controlled and/or regulated by specifying a maximum adhesive torque of the clutch and/or a target torque of at least one of the drive aggregates. The maximum adhesive torque indicates the maximum torque that is to be borne by the clutch when the clutch begins to slip. From the maximum adhesive torque, the corresponding pressure force for the clutch is determined in the control device. If the clutch is operated with slippage, then only the maximum adhesive torque is always transmitted, and any additional torque that is supplied to the clutch produces the slippage. The greater the difference between the maximum adhesive torque and the supplied torque, the faster the slippage increases, for which reason it is advantageous to use target torque values as manipulated variables. In this way, in particular the qualitative monitoring and/or specification of torques is enabled.

According to a development of the exemplary embodiments and/or exemplary methods of the present invention, it is provided that the slippage is controlled and/or regulated using a rotational speed of at least one of the drive aggregates. Here, a maximum adhesive torque and/or a target torque is determined from the rotational speed. In a clutch that is operated with slippage, the currently transmitted torque can be set and/or limited by a control device only up to a certain degree of precision through the direct specification of a maximum adhesive torque, because nonlinear influences such as varying coefficients of friction of the clutch facings, hydraulic imprecisions in a controlling of the clutch, mechanical imprecisions in the controlling of the clutch, and/or signal runtimes can be determined only with difficulty. The imprecisions in the controlling of the clutch have a disadvantageous effect in particular on driver comfort, such as for example during the starting and stopping of an internal combustion engine. In contrast, the rotational speeds of the drive aggregates can be detected easily and precisely. For this reason, a regulation of the slippage using the rotational speed of at least one of the drive aggregates, which may be of two drive aggregates, is advantageous. In particular a rotational speed difference of at least two drive aggregates that act on the clutch can be used as a highly precise measure for a specification of a maximum adhesive torque and thus of a pressure force.

According to a development of the exemplary embodiments and/or exemplary methods of the present invention, it is provided that each of the drive aggregates produces a torque. This operating state is referred to as hybrid operating mode. In this operating state, the slippage can be set very precisely, because the drive aggregates produce a known torque that can be used as reference points for the amount of the slippage.

According to a development of the exemplary embodiments and/or exemplary methods of the present invention, it is provided that a diagnosis and/or adaptation takes place on the basis of the rotational speeds of at least one of the drive aggregates, on the basis of the slippage of the clutch, and/or on the basis of a rotational speed difference at the clutch. In a hybrid drive device, evaluation of the rotational speeds and of the slippage makes it possible to make inferences concerning the operating state of the respective components, namely the drive aggregates and the clutch. This is based on known interactions of the individual components with one another. If, for example, the target torque of a drive aggregate is increased, the rotational speed of this drive aggregate can then increase on the basis of the slippage without having an influence on one of the other drive aggregates. This partial decoupling of the drive aggregates from one another via the clutch has the result that the rotational speeds of the individual drive aggregates, and thus the rotational speed difference at the clutch, are to a very high degree a function of the inherent dynamic behavior of the drive aggregates and of the clutch, so that a targeted intervention in one of the components brings about a change in the states that can be clearly attributed to the targeted intervention. In this way, a wide variety of types of diagnosis can be carried out for all the components involved.

According to a development of the exemplary embodiments and/or exemplary methods of the present invention, it is provided that a diagnosis of a production of torque by one of the drive aggregates takes place on the basis of a change in the rotational speed of the drive aggregate. In order to recognize a production of torque by the drive aggregate, the rotational speed of the drive aggregate is evaluated, because given a constant maximum adhesive torque the rotational speed increases only when the drive aggregate produces a separate torque. If there is an increase in rotational speed, then there is a production of torque, and the speed with which the rotational speed increases is a measure of the produced torque.

According to a development of the exemplary embodiments and/or exemplary methods of the present invention, it is provided that, for a diagnosis of a start process of one of the drive aggregates, the torque of the drive aggregate, recognized and/or determined during the diagnosis, is used. The diagnosis of the start process of the one drive aggregate takes place via the rotational speed of the other drive aggregate; on the basis of this rotational speed, inferences can be made concerning the produced torque, which in turn permit inferences concerning the extent to which a start process of a drive aggregate has taken place and is successful.

According to a development of the exemplary embodiments and/or exemplary methods of the present invention, it is provided that an end of the start process of one of the drive aggregates is detected on the basis of the recognized and/or determined torque. The start process of a drive aggregate is, depending on the design, associated with a characteristic production of torque that can be compared to the recognized and/or determined torque in order to detect an end of the start process.

According to a development of the exemplary embodiments and/or exemplary methods of the present invention, it is provided that in a diagnostic and/or adaptation operating mode dynamic mass forces of at least one of the drive aggregates and/or of the clutch are compensated. Dynamic mass forces occur in components during changes in rotational speed. When there is an acceleration of one of the drive aggregates, a part of the torque produced by the drive aggregate must be applied for the acceleration of its own inertia; i.e., if a target torque is required and the drive aggregate accelerates its rotational speed, the drive aggregate produces the required torque but only a part of the produced torque is transmitted to the clutch. Compensation of the values acquired for the purpose of calculation at the drive aggregates and the clutch enables highly precise diagnoses to be carried out both when rotational speed is constant and during a change in rotational speed. In addition, it is possible to check whether the manipulated variables are correctly set by the components, by establishing torque balances between the components. These balances are compensated on the basis of the dynamic mass forces. On the basis of the results, controllings of the components and/or the regulation are corrected or adapted so that a very high quality of regulation and precision of regulation is achieved in all operating ranges of the drive aggregates and the clutch during diagnostic and/or adaptation mode.

According to a development of the exemplary embodiments and/or exemplary methods of the present invention, it is provided that the torque of at least one of the drive aggregates is controlled and/or regulated using the slippage and the maximum adhesive torque. For reasons of cost, an acquisition of torque is generally not used. This can be realized by specifying the maximum adhesive torque and by monitoring the resulting slippage, for example on the basis of the rotational speeds. Here, the value of the torque present at the clutch can be determined due to the fact that at a particular maximum adhesive torque the clutch moves from adhesive mode to a slippage mode when the maximum adhesive torque is exceeded by the drive aggregates. Alternatively, the torque present can also be determined in that the clutch moves from slip operation to adhesive operation when the value falls below the maximum adhesive torque. In this way, changes in the torques that are supplied to the clutch and that thus come from the drive aggregates can be determined quantitatively via a change.

According to a development of the exemplary embodiments and/or exemplary methods of the present invention, it is provided that the torques of the drive aggregates are combined to form an overall drive torque that acts on the driven wheels of the motor vehicle. In this embodiment of the present invention, the torques produced by the drive aggregates are combined via the clutch in order to drive the vehicle together in the hybrid operating state. This operating state is called hybrid driving mode.

According to a development of the exemplary embodiments and/or exemplary methods of the present invention, it is provided that when the clutch moves into or out of diagnostic and/or adaptation operating mode, the overall drive torque is maintained. Through corresponding regulation, it is achieved that the transition into or out of diagnostic and/or adaptation mode is completed without affecting the overall drive torque. This increases driver comfort, because such a transition will not be detectable by the driver, for which reason diagnostic and/or adaptation mode can be used in all operating states. In order to achieve this, the additional torque required for the controlling and/or regulation of the slippage is applied by at least two drive aggregates working together, each of which applies the amount of the additional torque to the clutch in opposite directions to one another.

The oppositely oriented application of the required torque means that the additionally produced torques cancel one another with regard to the overall drive torque, for which reason the overall drive torque is not altered by the application.

According to a development of the exemplary embodiments and/or exemplary methods of the present invention, it is provided that in a normal operating mode of the hybrid drive device the clutch is operated in a diagnostic and/or adaptation mode. This is possible in particular if the overall drive torque is not altered by the diagnostic and/or adaptation operating mode. In this way, diagnoses and adaptations are not limited to maintenance intervals, but can be carried out immediately as needed.

In addition, a hybrid drive device of a motor vehicle, in particular for carrying out the method as recited in one or more of the preceding claims, is provided that has at least two different drive aggregates, in particular an electric motor and an internal combustion engine, and a clutch, the drive aggregates being capable of being operatively connected using the clutch. It is provided that in a diagnostic or adaptation operating mode, the clutch forms a slip clutch. When the drive aggregates are in operative connection via the clutch, the slip clutch makes it possible to maintain a difference in rotational speed between the drive aggregates, a torque being transmitted.

In addition, a control device is provided for a hybrid drive device of a motor vehicle, in particular for carrying out the method as recited in one or more of the preceding claims, the hybrid drive device having at least two different drive aggregates, in particular an electric motor and an internal combustion engine, as well as a clutch that is actuated by control signals supplied by the control device, the drive aggregates being capable of being operatively connected using the clutch. Here it is provided that the control devices are fashioned in such a way that in a diagnostic and/or adaptation mode control signals are produced in order to operate the clutch in a slip operating mode. The control device may be realized as a control apparatus allocated to the clutch. The control apparatus can be a separate control apparatus for the clutch, or alternatively can be a further control apparatus in the motor vehicle that also produces, in addition to control signals for the clutch, control signals for other vehicle components.

Finally, a motor vehicle aggregate is provided having a control device (10) and a hybrid drive device (1) as described herein.

The drawings illustrate the exemplary embodiments and/or exemplary methods of the present invention on the basis of an exemplary embodiment.

DETAILED DESCRIPTION

Figure 1:
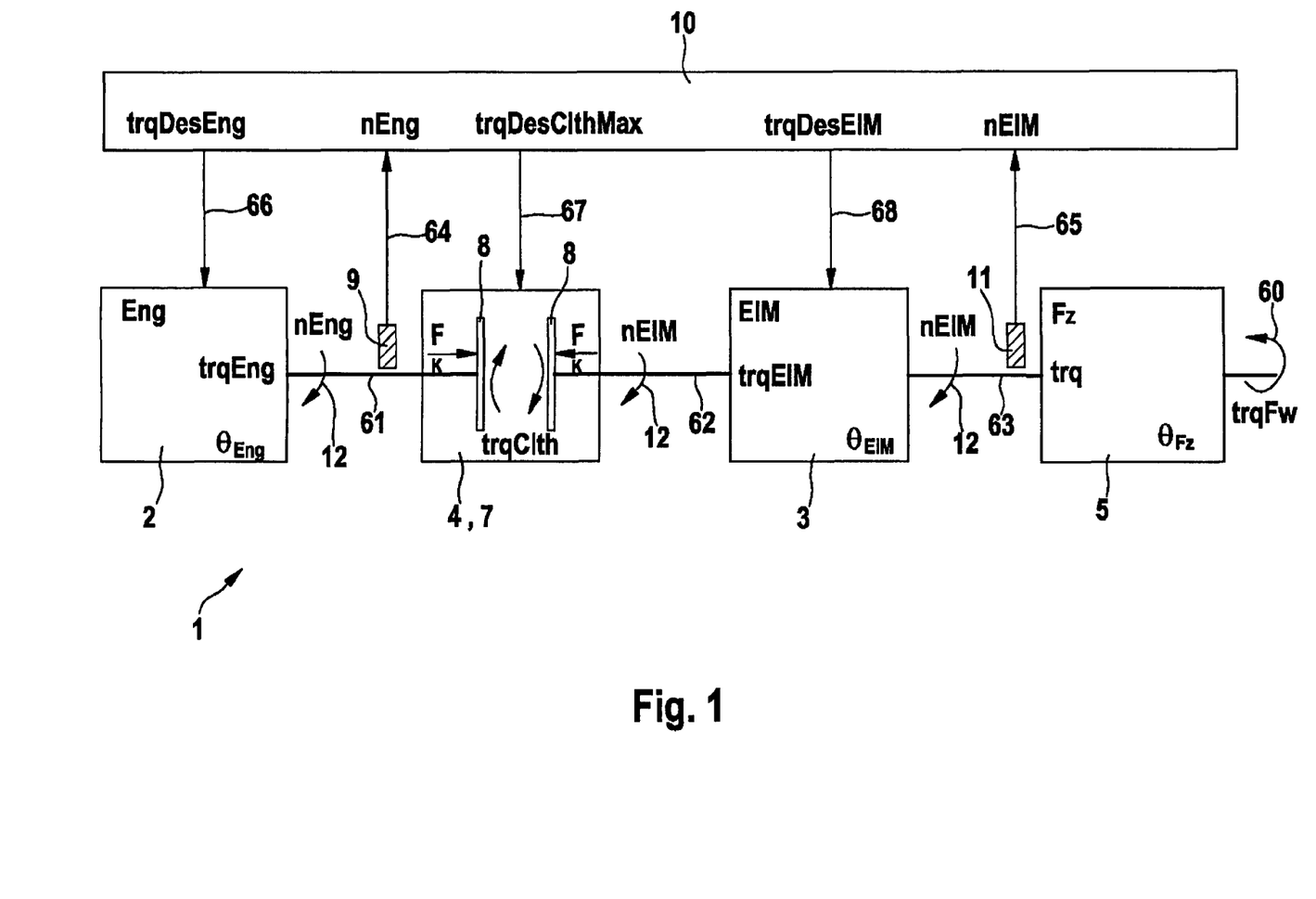
FIG. 1 shows a schematic design of a hybrid drive device.

FIG. 1 shows a simplified model of a hybrid drive device 1 having an internal combustion engine 2, an electric motor 3, and, situated between these, a clutch 4 that is operatively connected to internal combustion engine 2 via a shaft 61 and to electric motor 3 via a shaft 62. In addition, electric motor 3 is connected to a vehicle driven side 5 via a shaft 63. It is also possible for internal combustion engine 2 and/or electric motor 3 to act on clutch 4 a via a transmission. A coupling via the vehicle as a whole is also possible, for example if internal combustion engine 2 and electric motor 3 act on separate drive axes or separate driven wheels. The operative transmission ratios are then to be taken into account for the rotational speeds and torques. For internal combustion engine 2, an equivalent rotational mass Eng having a moment of inertia $\theta_{Eng}$ is assumed. For the electric motor, an equivalent rotational mass EIM is assumed having a moment of inertia $\theta_{EIM}$. Vehicle driven side 5 combines vehicle components that are not shown, such as a transmission, wheels, and a vehicle mass that is moved translationally, in that for vehicle driven side 5 a vehicle equivalent rotational mass Fz having a moment of inertia $\theta_{Fz}$ is assumed. Here, rotational moments of inertia of individual components of vehicle driven side 5, as well as the translationally moved vehicle mass, are converted to their action on shaft 63 on the basis of transmission ratios. Clutch 4 is realized as friction clutch 7 having friction facings 8. Here, friction clutch 7 has a torque-limited action. In addition, a control device 10 that produces control signals, a rotational speed sensor 9, and a further rotational speed sensor 11 are allocated to hybrid drive device 1.

Shafts 61, 62, and 63 are free of moments of inertia, shaft 61 rotating in a direction of rotation 12 with a rotational speed nEng and shafts 62 and 63 rotating in direction of rotation 12 with a rotational speed nEIM. In addition, internal combustion engine 2 produces a torque trgEng that is transmitted to friction clutch 7 via shaft 61. Friction clutch 7 transmits a torque trqClth that is transmitted to electric motor 3 via shaft 62; electric motor 3 produces a torque trqEIM. In this way, an overall drive torque trq is supplied to driven side 5 via shaft 63. Driving resistance forces that act on the vehicle, such as air resistance, roll resistance, and climbing resistance, are converted into a driving resistance torque trqFw acting on vehicle driven side 5, which acts in a direction of rotation 60 that runs opposite to direction of rotation 12. Control device 10 is provided with the corresponding rotational speeds nEng and nEIM by rotational speed sensors 9 and 11, via arrows 64 and 65. A target torque trqDesEng of the internal combustion engine is specified to internal combustion engine 2 by control device 10 via an arrow 66, said torque acting on equivalent rotational mass Eng in direction of rotation 12. In addition, control device 10 transmits a maximum adhesive torque trqDesClthMax as a control signal to friction clutch 7 via an arrow 67, and transmits a target torque trqDesEIM of the electric motor to electric motor 3 via an arrow 68, said torque acting on equivalent rotational mass EIM in direction of rotation 12. In addition, control device 10 transmits a maximum adhesive torque trqDesClthMax to friction clutch 7 via an arrow 67 as a control signal, and transmits a target torque trqDesEIM of the electric motor to electric motor 3 via an arrow 68, said torque acting on equivalent rotational mass EIM in direction of rotation 12.

Maximum adhesive torque trqDesClthMax, which is greater than or equal to zero, is specified to friction clutch 7 by control device 10, and influences a pressure force $F_k$ that presses friction facings 8 in friction clutch 7 against one another. If the behavior of friction clutch 7 is assumed to be ideal, a frictional force of the clutch is proportional to pressure force $F_k$. If the magnitude of torque trqClth currently transmitted via friction clutch 7 is then smaller than maximum adhesive torque trqDesClthMax, adhesive friction is present at friction clutch 7. For adhesive friction, the following precondition holds:

$$|trqClth| < trqDesClthMax$$

Here, the currently transmitted torque trqClth can act in both directions of rotation, i.e. can have a positive or negative sign. Rotational speed nEng of internal combustion engine 2 then corresponds to rotational speed nEIM of electric motor 3. If the magnitude of currently transmitted torque trqClth increases to the maximum adhesive torque trqDesClthMax, clutch 4 makes a transition to slip mode, in which the magnitude of currently transmitted torque trqClth corresponds to maximum adhesive torque trqDesClthMax. Here, a difference in rotational speeds results between internal combustion engine 2 and electric motor 3. The transmission of torque is then limited to maximum adhesive torque trqDesClthMax, as long as friction clutch 7 behaves ideally. The sign of currently transmitted torque trqClth is a function of the sign of the difference in rotational speeds. The following relationship than holds for torque trqClth transmitted to the clutch:

$$trqClth = trqDesClthMax \cdot sign(nEng - nEIM)$$

Control device 10 can influence the state of friction clutch 7 by modifying maximum adhesive torque trqDesClthMax. In the purely electric driving mode, friction clutch 7 is completely open, so that trqDesClthMax=0. A starting of internal combustion engine 2 from electric driving mode takes place by closing friction clutch 7, with rotating electric motor 3, while internal combustion engine 2 is at first at a standstill. Maximum adhesive torque trqDesClthMax then becomes greater than zero, causing a tow-starting of internal combustion engine 2 as soon as torque losses such as friction and compression torques have been overcome.

Figure 2:
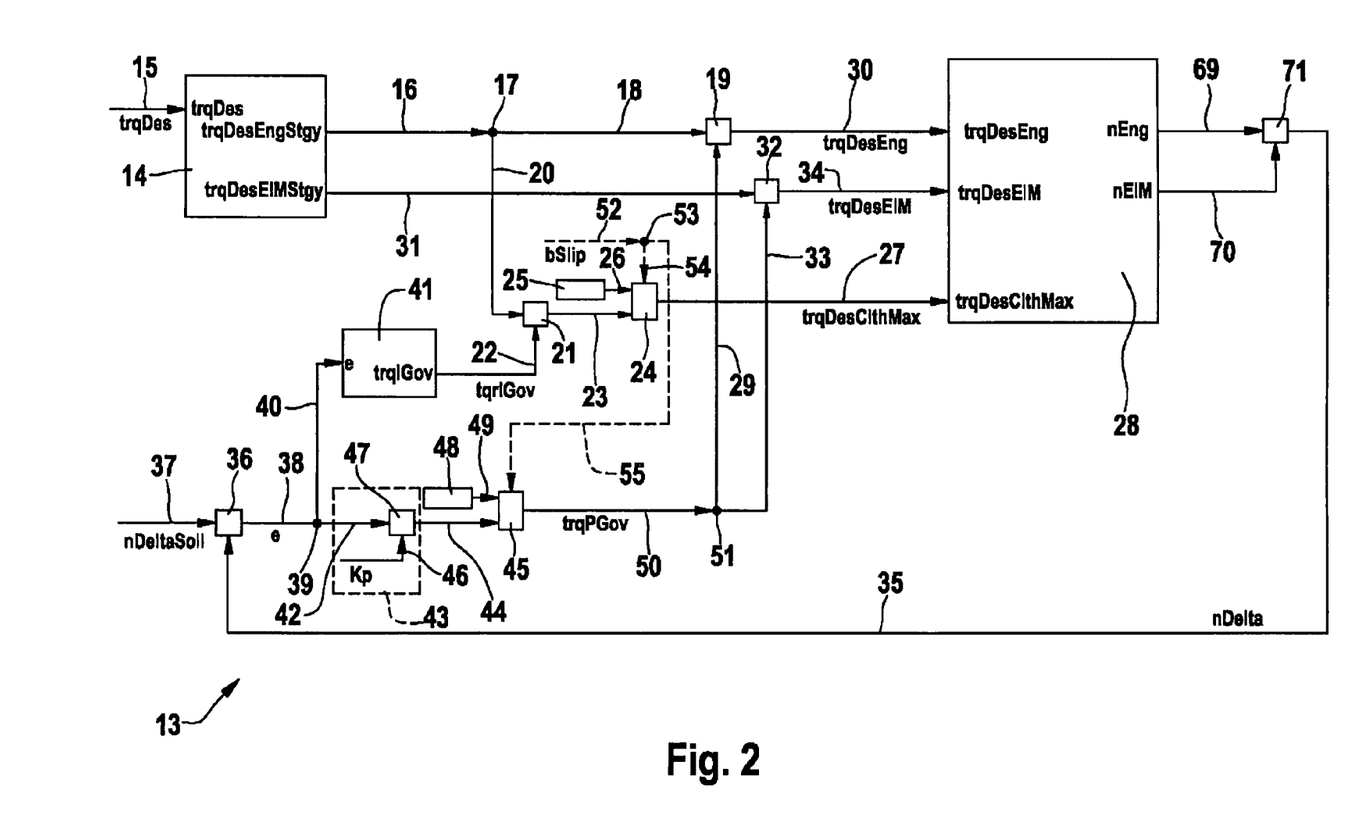
FIG. 2 shows a structural diagram of an exemplary embodiment for the method according to the present invention.

FIG. 2 shows a calculation rule 13, which is supplied with the signals of an overall drive target torque trqDes, a binary signal bSlip, and a target rotational speed difference nDeltaSoll. Overall drive target torque trqDes is supplied to a strategy block 14 via an arrow 15. From strategy block 14, via an arrow 16 a strategy target torque trqDesEngStgy for an internal combustion engine is transmitted to a node point 17, and is forwarded to a summation unit 19 via an arrow 18. From node point 17, strategy target torque trqDesEngStgy of the internal combustion engine is transmitted to a subtraction unit 21 via an arrow 20. In subtraction unit 21, an integral governor torque trqIGOV is also supplied via a an arrow 22. The result determined by subtraction unit 21 is forwarded to a changeover switch 24 via an arrow 23, which also receives a fixed value 25 via an arrow 26. The result of changeover switch 24 is a maximum adhesive torque trqDesClthMax, which is supplied to a drive train model 28 via an arrow 27. A proportional governor torque trqPGov is transmitted to summation unit 19 via an arrow 29. The result of summation unit 19 is a target torque trqDesEng of the internal combustion engine, and is supplied to drive train model 28 via an arrow 30. Strategy block 14 transmits, via an arrow 31, a strategy target torque trqDesEIMStgy for an electric motor to a subtraction unit 32, which also receives proportional governor torque trqPGov via an arrow 33.

The result of subtraction unit 32 is a target torque trqDesEIM of the electric motor, which is supplied to drive train model 28 via an arrow 34. From the variables supplied to it, drive train model 28 calculates a rotational speed nEng of internal combustion engine 2 and a rotational speed nEIM of electric motor 3. Subtraction unit 71 calculates a rotational speed difference nDelta that is forwarded to a subtraction unit 36 via an arrow 35. The subtraction unit also receives target rotational speed difference nDeltaSoll via an arrow 37. The result of subtraction unit 36 is a regulation deviation e, which is supplied to a node point 39 via an arrow 38. From node point 39, an arrow 40 runs to an integral governor 41 that produces integral governor torque trqIGOV and forwards it to arrow 22. From node point 39, another arrow 42 runs to a proportional governor 43 that forwards its result via an arrow 44 to a changeover switch 45. The proportional governor is made up of a proportional governing factor Kp that is predetermined and that is transmitted to a multiplication unit 47 via an arrow 46. The multiplication unit also receives the regulation deviations via arrow 42. Changeover switch 45 also receives a fixed value 48 via an arrow 49. The value determined by changeover switch 45 is proportional governor torque trqPGov, which is transmitted to a node point 51 via an arrow 50. This goes into arrows 29 and 33. Binary signal bSlip is used to control changeover switches 24 and 45. Via an arrow 52, this signal is supplied to a node point 53. From there, signal bSlip runs via an arrow 54 to changeover switch 24 and via an arrow 55 to changeover switch 45.

Hybrid drive device 1 of FIG. 1 is symbolized in FIG. 2 by drive train model 28, which contains its components. Strategy block 14 is a torque divider that divides the overall target drive torque trqDes required by a driver, a driver assistance system, or a rotational speed governor, according to consumption and emissions, into strategy target torque trqDesEngStgy for internal combustion engine 2 and strategy target torque trqDesEIMStgy for electric motor 3, so that the following holds:

$$trqDes = trqDesEngStgy + trqDesEIMStgy$$

Target torques trqDesEng for internal combustion engine 2 and trqDesEIM for electric motor 3 result from the respective strategy target torque trqDesEngStgy and trqDesEIMStgy. Here, strategy target torque trqDesEngStgy is added to proportional governor torque trqPGov of proportional governor 43, and target torque trqDesEng results. In order to produce target torque trqDesEIM for electric motor 3, proportional governor torque trqPGov is subtracted from strategy target torque trqDesEIMStgy. Binary signal bSlip acts on changeover switch 24 which, in a normal operating state with bSlip=false, then switches maximum adhesive torque trqDesClthMax to a fixed value 25. Fixed value 25 is selected large enough that friction clutch 7 in drive train model 28 is completely closed, so that as a result it is in an adhesive friction operating state. In the adhesive friction operating state with bSlip=false, proportional governor torque trqPGov is set by changeover switch 45 to fixed value 48, which corresponds to 0 Nm. Target torques trqDesEng for internal combustion engine 2 and trqDesEIM for electric motor 3 then correspond to strategy target torques trqDesEngStgy and trqDesEIMStgy. Rotational speed difference nDelta results within drive train model 28 from rotational speed nEng of internal combustion engine 2 and rotational speed nEIM of electric motor 3, as follows:

$$nDelta = nEng - nEIM$$

In the adhesive friction operating state, with completely closed friction clutch 7, either nEng=nEIM or nDelta=0, which describes synchronization of the two drive aggregates. Comparison of rotational speed difference nDelta to target rotational speed difference nDeltaSoll in subtraction unit 36 results in regulation deviation e, with:

$$e = nDeltaSoll - nDelta$$

A transition from an adhesive friction operating state with adhesive friction clutch 7 into a diagnostic and/or adaptation operating mode with slipping friction clutch 7 takes place in that binary signal bSlip=true is specified, causing changeover switches 24 and 45 to be correspondingly switched over. Regulation deviation e is multiplied by proportional governing factor Kp of proportional governor 43 at multiplication point 47, yielding proportional governor torque trqPGov. In addition to this, an integral governor torque trqIGOV is formed in integral governor 41. This corresponds to a temporal integral of regulation deviation e multiplied by an integral amplification factor KI. Integral governor torque trqIGOV is initialized to 0 Nm during the adhesive friction operating state, and begins from this value after a change to the diagnostic and/or adaptation operating mode. In diagnostic or adaptation operating mode, maximum adhesive torque trqDesClthMax is calculated from strategy target torque trqDesEngStgy for internal combustion engine 2 minus integral governor torque trqIGOV. For simplicity, in the example shown it is assumed that strategy target torque trqDesEngStgy for internal combustion engine 2 is positive, i.e. is greater than 0 Nm, and target rotational speed difference nDeltaSoll is positive, i.e. is greater than 0 RPM. Given a negative strategy target torque trqDesEngStgy for internal combustion engine 2 and a negative target rotational speed difference nDeltaSoll, in diagnostic and/or adaptation operating mode maximum adhesive torque trqDesClthMax would be calculated from the magnitude of strategy target torque trqDesEngStgy plus integral governor torque trqIGOV.

Limits on maximum adhesive torque trqDesClthMax, which has to be greater than or equal to 0 Nm because friction clutch 7 is completely open when trqDesClthMax=0, are also not shown. In diagnostic and/or adaptation operating mode, maximum adhesive torque trqDesClthMax is pre-controlled with strategy target torque trqDesEngStgy for internal combustion engine 2. In this way, friction clutch 7 is operated close to a boundary between, adhesive operation and slippage operation. Rotational speed difference nDelta between rotational speed nEng of internal combustion engine 2 and, rotational speed nEIM of electric motor 3 is adjusted to target rotational speed difference nDeltaSoll. This takes place in that nEng and nEIM, or regulation deviation e determined therefrom, act on maximum adhesive torque trqDesClthMax. If rotational speed difference nDelta is too small relative to target rotational speed difference nDeltaSoll, integral governor torque trqIGOV increases, and maximum adhesive torque trqDesClthMax is canceled, causing the slippage to increase at friction clutch 7, and thus increasing rotational speed difference nDelta. Pre-controlling with strategy target torque trqDesEngStgy for internal combustion engine 2 relieves stress on the regulation, and provides good regulation quality even given dynamic operation, such as is the case given dynamic behavior of strategy target torque trqDesEngStgy.

One or more additional pre-controlling(s), for compensation of mass inertias given dynamic rotational speed trends, is/are also conceivable in order to increase regulation quality.

Under real-world operating conditions, torque trqClth currently transmitted by friction clutch 7 in diagnostic and/or adaptation operating mode generally follows prespecified maximum adhesive torque trqDesClthMax imprecisely and with a delay. In addition, hysteresis behavior is often present. Both these phenomena result from varying coefficients of friction of clutch facings 8, hydraulic and mechanical imprecision of the control device of friction clutch 7, and signal runtimes. For these reasons, in diagnostic and/or adaptation operating mode, in particular given dynamic operation of the vehicle, regulation quality can be further improved if target torques trqDesEng for internal combustion engine 2 and trqDesEIM for electric motor 3 are additionally influenced by rotational speed nEng of internal combustion engine 2 and rotational speed nEIM of electric motor 3. This takes place using proportional governor torque trqPGov, while integral governor torque trqIGOV acts on maximum adhesive torque trqDesClthMax of friction clutch 7 and compensates imprecision in the control device of friction clutch 7. Proportional governor torque trqPGov is applied with different signs to target torques trqDesEng for internal combustion engine 2 and trqDesEIM for electric motor 3. This has the advantage that governor interventions have no influence on an overall drive torque trq that is forwarded to the driven wheels by transmission 5.

This results in a high degree of driver comfort. In particular, this high degree of driver comfort results when, given a climbing edge of binary signal bSlip, friction clutch 7 does not move immediately to slip operation, which is possible due to the imprecisions, and this is compensated by integral governor torque trqIGOV, which is associated with a temporally delayed transition to slip operation. Before this transition, the sum of target torques trqDesEng and trqDesEIM also correspond to overall drive target torque trqDes, because proportional governor torque trqPGov is canceled due to the different signs. Therefore, the following holds in calculating rule 13:

$$trqDesEng+trqDesEIM=trqDesEngStgy+trqPGov+trqDesEIMStgy-trqPGov=trqDes$$

Overall drive target torque trqDes is retained without modification and is forwarded to the driven wheels. For the same reason, given stationary operation of the drive there is a conservation of momentum for the transition to slip operation. In stationary operation, the torques that externally influence the system cancel one another in their sum, because the driver compensates a vehicle resistance torque trqFw with overall drive target torque trqDes. Therefore, in drive train model 28 the following holds:

$$trqFw=trqDes=trqDesEng+trqDesEIM$$

The changes in rotational speeds nEng and nEIM during the transition to slip operation behave in a manner corresponding to the moments of inertia:

$$\theta_{Ers}=(\theta_{Fz}+\theta_{EIM}) \text{ and } \theta_{Eng}$$

As needed, a modification of rotational speed nEIM of electric motor 3, and thus of the drive wheels, can be prevented via the moments of inertia by a pre-controlling, due to the unambiguously determined relationships, which also increases driver comfort. The governor structure selected in calculation rule 13 is one possible specific embodiment; for other friction clutches with switching behavior, for example a switching governor part may additionally be used.

Figure 3:
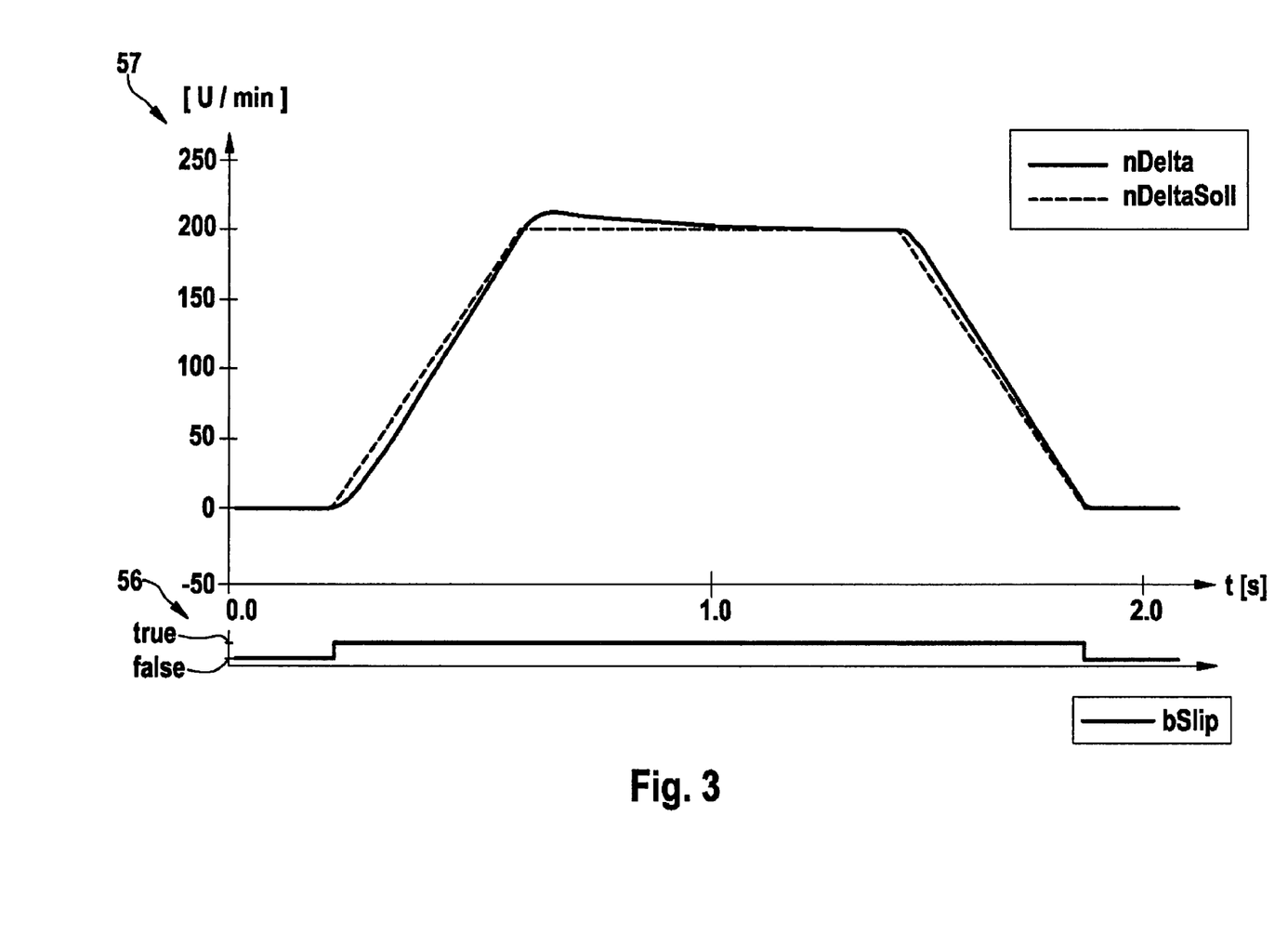
FIG. 3 shows simulation results of the exemplary embodiment for a binary slip signal.

FIGS. 3 through 6 show results of calculation rule 13 of FIG. 2. During the entire calculation, a constant overall drive target torque trqDes is provided that is constantly divided by strategy block 14 into strategy target torque trqDesEngStgy for internal combustion engine 2 and trqDesEIMStgy for electric motor 3. Driving resistance torque trqFw corresponds to the overall drive target torque trqDes, so that stationary operation is present. FIG. 3 shows a temporal curve of binary signal bSlip in a coordinate system 56. In addition, in a Cartesian coordinate system 57 temporal curves are shown of the target rotational speed difference nDeltaSoll, specified by control device 10 in ramp-shaped fashion between a minimum nDeltaSollMin of 0 RPM and a maximum nDeltaSollMax of 200 RPM, and of adjusted rotational speed difference nDelta. Here, nDelta is shown in broken lines.

Figure 4:
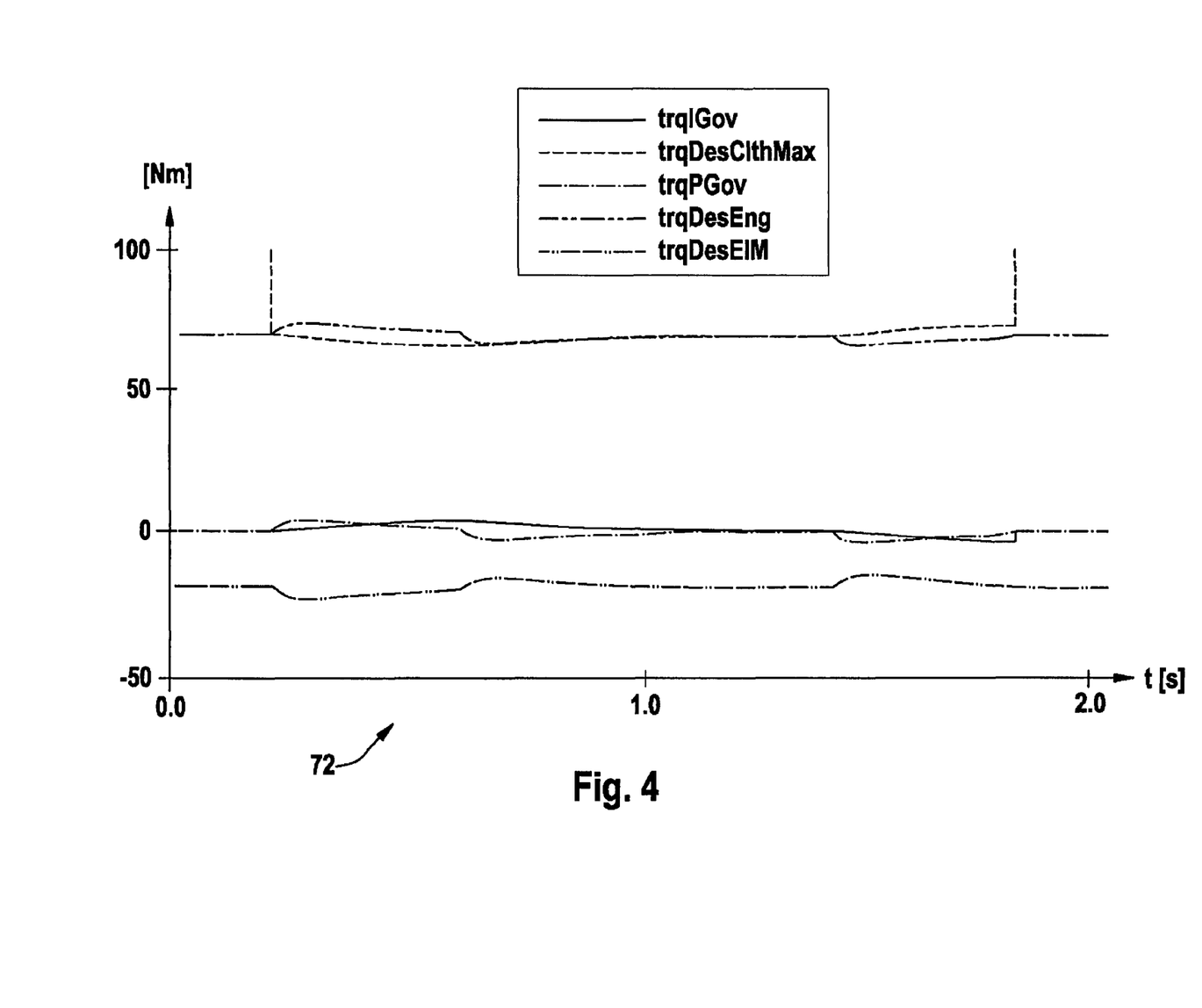
FIG. 4 shows simulation results of the exemplary embodiment for a course of torques.

FIG. 4 shows, in a coordinate system 72, temporal curves of the calculated torques trqDesEng, trqDesEIM, trqIGOV, trqPGov, and trqDesClthMax. Here, the changes in the torques are shown very clearly at the moment of the changeover of binary signal bSlip.

During the depicted time range, an overall target torque of trqDes=50 Nm
is specified, which is divided by strategy block 14 in a constant manner into the strategy target torque for internal combustion engine 2
trqDesEngStgy=0.70 Nm
and for electric motor 3
trqDesEIMStgy=−20 Nm.
Driving Resistance Torque
trqFw=50 Nm
corresponds to the overall drive target torque trqDes, so that stationary operation of the vehicle is present with constant vehicle speed.

At the beginning of the depicted time range, binary signal bSlip=false. Fixed value 25 specifies a high maximum adhesive torque trqDesClthMax, causing friction clutch 7 in drive train model 28 to be completely closed. Proportional governor torque trqPGov and integral governor torque trqIGOV are equal to zero. Target torque trqDesEng thus corresponds to strategy target torque trqDesEngStgy, and target torque trqDesEIM corresponds to strategy target torque trqDesEIMStgy. An adhesive frictional operating state is present, because rotational speed nEng of internal combustion engine 2 corresponds to rotational speed nEIM of electric motor 3.

At time t=0.2 seconds, with specification bSlip=true there is a transition into diagnostic and/or adaptation operating mode. Through reduction of maximum adhesive torque trqDesClthMax, friction clutch 7 moves into slip operation. At time t=0.2 seconds, the prespecified target rotational speed difference nDeltaSoll also begins to increase. Through intervention in manipulated variables trqDesClthMax, trqDesEng, and trqDesEIM, the governor ensures that rotational speed difference nDelta follows target rotational speed difference nDeltaSoll with a slight variation.

Figure 5:
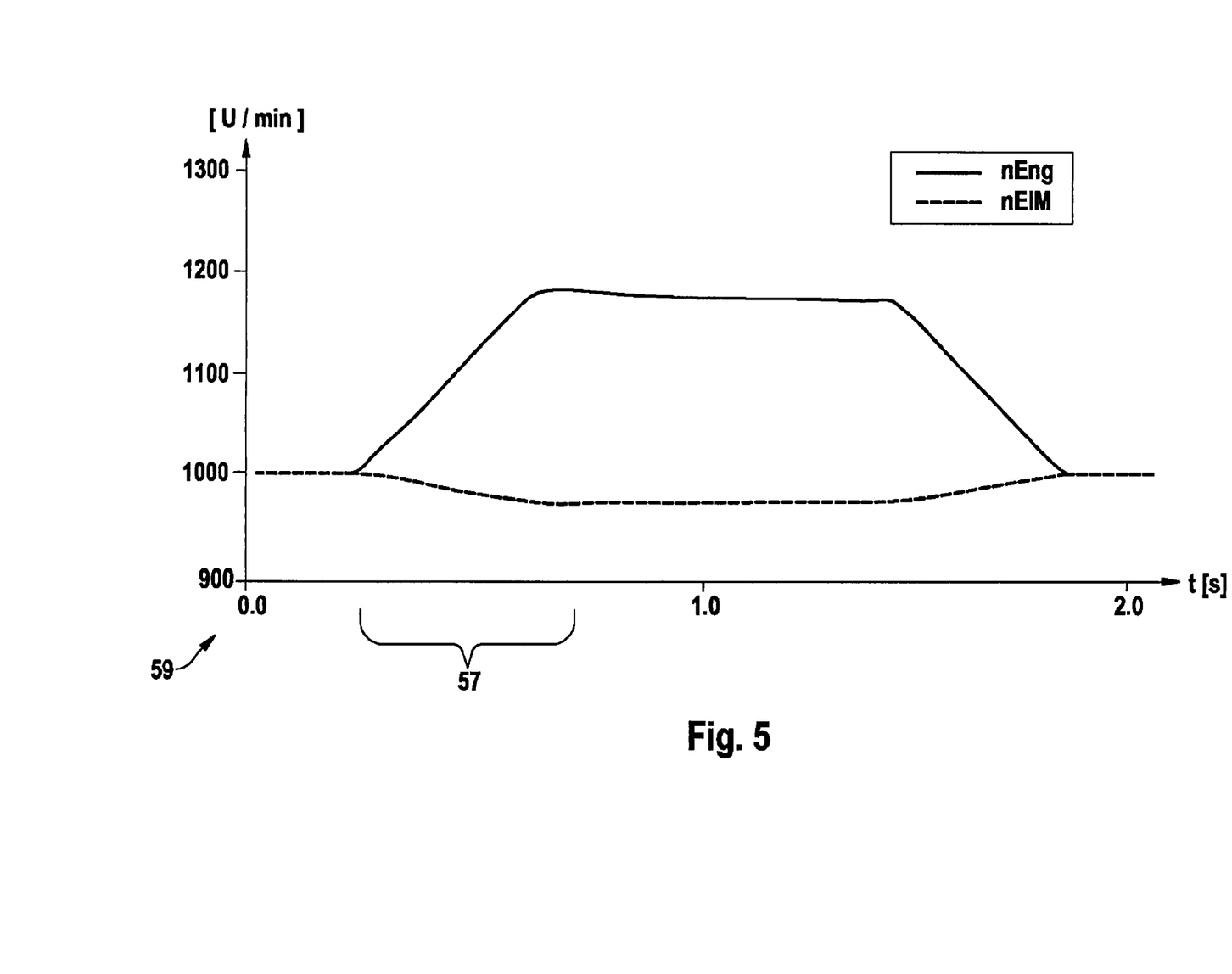
FIG. 5 shows simulation results of the exemplary embodiment for rotational speeds of two drive aggregates.

FIG. 5 shows temporal curves of rotational speeds nEng and nEIM in a Cartesian coordinate system 59 in revolutions per minute (RPM). As already mentioned, rotational speeds nEng and nEIM change in a manner corresponding to the inertial conditions, on the basis of the law of conservation of momentum. In particular, there is a decrease in rotational speed 57 of rotational speed nEIM after the switching over of binary slip signal bSlip.

Target torque trqDesEng of internal combustion engine 2 is positive for the depicted time range. Upon transition of friction clutch 7 to slip operation, rotational speed nEng of internal combustion engine 2 increases relative to rotational speed nEIM of electric motor 3. This proves that internal combustion engine 2 is producing a positive torque. If internal combustion engine 2 were to produce a negative torque, for example a torque loss due to skipped combustions resulting from an error in internal combustion engine 2, there would result a decrease in rotational speed nEng of internal combustion engine 2 relative to rotational speed nEIM of electric motor 3 when friction clutch 7 moves to slip operation. Electric motor 3 would carry internal combustion engine 2 along.

If some combustions take place correctly and others incorrectly in alternating fashion, for example in the case of misfirings, this would result in a non-uniform torque of internal combustion engine 2 and thus non-uniformity in the curve of rotational speed nEng of internal combustion engine 2. Given a slipping friction clutch 7, these non-uniformities in the rotational speed are strongly pronounced, because in the case of slippage internal combustion engine 2 is decoupled from the inertias of the rest of the hybrid drive train 1 and thus from the vehicle driven side. Corresponding algorithms for recognizing misfirings by evaluating rotational speed nEng of internal combustion engine 2 are present in modern engine control systems. A correct combustion in all cylinders of internal combustion engine 2 is attested by a uniform curve, not superimposed with waviness, of rotational speed nEng of internal combustion engine 2, as shown in FIG. 5.

Correct operation, i.e. error-free combustion, of internal combustion engine 2 can be verified through evaluation (diagnosis) of rotational speed nEng of internal combustion engine 2 in diagnostic and/or adaptation operating mode. In particular after a successful start of internal combustion engine 2, this possibility of verification is valuable because, for reasons of cost, torques are usually not measured, and other verification methods have only limited diagnostic reliability.

Through modulation of target rotational speed difference nDeltaSoll, for example by specifying, in diagnostic and/or adaptation operating mode, a sinusoidal temporal curve for target rotational speed difference nDeltaSoll as a stimulus or test signal for the regulation, the quality of diagnostic statements can be improved through evaluation of the resulting signal curves.

Given a constant rotational speed nEng, the torque actually produced by internal combustion engine 2 corresponds to torque trqClth currently transmitted by the friction clutch. By comparing target torque trqDesEng of internal combustion engine 2 to prespecified maximum adhesive torque trqDesClthMax of friction clutch 7, in diagnostic and/or adaptation operating mode imprecisions can be determined in the controlling of internal combustion engine 2 and of friction clutch 7. If it is assumed that the torque actually produced by internal combustion engine 2 corresponds approximately to target torque trqDesEng, then integral governor torque trqIGOV compensates deviations of torque trqClth, currently transmitted in the slippage of frictional coupling 7, from the prespecified maximum adhesive torque trqDesClthMax. Integral governor torque trqIGOV is thus a measure of imprecisions in the controlling of friction clutch 7, and can be used for adaptations or corrections of the controlling.

The precision of the adaptations is a function of the precision in the controlling of internal combustion engine 2. The controlling of internal combustion engine 2 can for example be adapted to the driven wheels if friction clutch 7 is open, or through comparison of target torques trqDesEIM and trqDesEng if a non-positive connection is not present.

In dynamic operation, i.e. given rotational speeds that change over time, all adaptations can be improved by taking into account inertias and torque portions that are required for acceleration. In addition, a correction of the rotational speeds nEng and/or nEIM is advantageous in order to compensate time delays in the detections of rotational speeds or signal transmissions.

Through a modulation of target rotational speed difference nDeltaSoll, for example a sinusoidal temporal curve, and observation of the signal curves, in diagnostic and/or adaptation operating mode the hysteresis behavior in the controlling of the clutch, for example different behavior during opening and closing, can be determined.

In FIG. 4, integral governor torque trqIGOV becomes close to 0 Nm as soon as the rotational speeds have a low dynamic characteristic, which permits inference of the presence of small imprecisions in the controlling of friction clutch 7. Correction or adaptation of the controlling of friction clutch 7 is not required. Otherwise, the controlling of friction clutch 7 would have to be corrected or adapted in such a way that integral governor torque trqIGOV would become close to 0 Nm.

Figure 6:
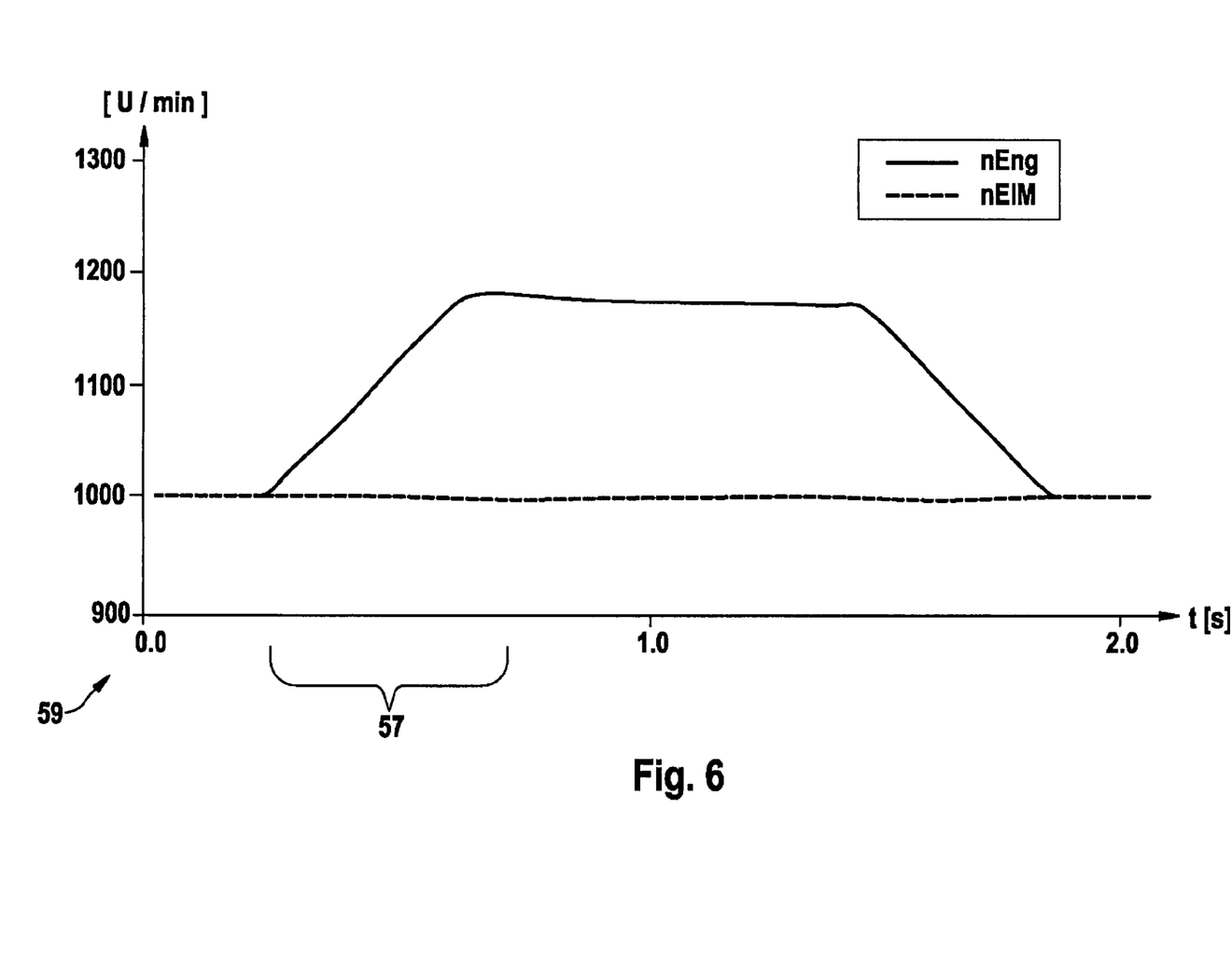
FIG. 6 shows simulation results of the exemplary embodiment for the rotational speeds given an additional application of a pre-control torque.

FIG. 6 shows temporal curves of rotational speeds nEng and nEIM in a Cartesian coordinate system 59 with additional application of a pre-controlling torque trqPreEIM to target torque trqDesEIM for electric motor 3, the following holding:

$$trqPreEIM = \theta_{Eng} \cdot (n/(30\ RPM)) \cdot d/dt(n\text{DeltaSoll})$$

Comparison of FIGS. 5 and 6 shows that the decrease in rotational speed 57 of electric motor 3 seen in FIG. 5 is not present in FIG. 6. Rotational speed nEIM at electric motor 3, and thus the rotational speed of vehicle equivalent rotational mass Fz, which represents a vehicle speed, does not change. There result smooth transitions from and to diagnostic and/or adaptation operating mode, together with a high degree of driver comfort.

In motor vehicles having a torque converter, the influencing and/or opening of a torque converter lockup clutch may also be used in order to increase driver comfort, at least for the transitions from and to a diagnostic and/or adaptation operating mode.

What is claimed is:

1. A method for operating a hybrid drive device of a motor vehicle having at least two different drive aggregates, including an electric motor and an internal combustion engine, and having a clutch, the method comprising:
   operatively connecting the drive aggregates by using the clutch; and
   operating the clutch with a slippage in at least one of a diagnostic operating mode for detecting fault-free operation of the drive aggregates by monitoring the rotational speed thereof and an adaptation operating mode for predefining a qualitative generation of torque by the drive aggregates.

2. The method of claim 1, wherein the slippage is at least one of controlled and regulated.

3. The method of claim 1, wherein the slippage is at least one of controlled and regulated by pre-specifying at least one of a maximum adhesive torque of the clutch and a target torque of at least one of the drive aggregates.

4. The method of claim 1, wherein the slippage is at least one of controlled and regulated using a rotational speed of at least one of the drive aggregates.

5. The method of claim 1, wherein each of the drive aggregates produces a torque.

6. The method of claim 1, wherein at least one of a diagnosis and an adaptation takes place at least one of on the basis of the rotational speed of at least one of the drive aggregates, on the basis of the rotational speed difference at the clutch, and on the basis of the slippage.

7. The method of claim 1, wherein at least one of a diagnosis and an adaptation of a production of torque of one of the drive aggregates takes place on the basis of a change in the rotational speed of the drive aggregate.

8. The method of claim 1, wherein for a diagnosis of a start process of one of the drive aggregates, the torque of the drive aggregate, at least one of recognized and determined during the diagnosis, is used.

9. The method of claim 1, wherein an end of the start process of one of the drive aggregates is detected on the basis of at least one of the recognized torque and the determined torque.

10. The method of claim 1, wherein, in at least one of a diagnostic operating mode and an adaptation operating mode, dynamic mass forces of at least one of the drive aggregates and of the clutch are compensated.

11. The method of claim 1, wherein the torque of at least one of the drive aggregates is at least one of controlled and regulated using the slippage and the maximum adhesive torque.

12. The method of claim 1, wherein the torques of the drive aggregates are combined to form an overall drive torque that acts on the driven wheels of the motor vehicle.

13. The method of claim 1, wherein when there is a transition of the clutch into or out of at least one of the diagnostic operating mode and the adaptation operating mode, the overall drive torque is maintained.

14. The method of claim 1, wherein in a normal operating mode of the hybrid drive device, the clutch is operated in at least one of the diagnostic operating mode and the adaptation operating mode.

15. A hybrid drive device of a motor vehicle, comprising:
   at least two different drive aggregates, including an electric motor and an internal combustion engine;
   a clutch, wherein the drive aggregates are operatively connected using the clutch, wherein in at least one of a diagnostic operating mode for detecting fault-free operation of the drive aggregates by monitoring the rotational speed thereof and an adaptation operating mode for predefining a qualitative generation of torque by the drive aggregates, the clutch forms a slip clutch.

16. A control device for a hybrid drive device of a motor vehicle, the hybrid drive device having at least two different drive aggregates, including an electric motor, an internal combustion engine, and a clutch, comprising:
   a control signal arrangement for supplying control signals to actuate the clutch, wherein the drive aggregates are operatively connectable using the clutch, and wherein the control device is configured so that in at least one of a diagnostic operating mode for detecting fault-free operation of the drive aggregates by monitoring the rotational speed thereof and an adaptation operating mode it produces control signals for operating the clutch in a slip operating mode for predefining a qualitative generation of torque by the drive aggregates.

17. A motor vehicle, comprising:
   a hybrid drive device having at least two different drive aggregates, including an electric motor, an internal combustion engine, and a clutch; and
   a control device for the hybrid drive device, including a control signal arrangement for supplying control signals to actuate the clutch, wherein the drive aggregates are operatively connectable using the clutch, and wherein the control device is configured so that in at least one of a diagnostic operating mode for detecting fault-free operation of the drive aggregates by monitoring the rotational speed thereof and an adaptation operating mode for predefining a qualitative generation of torque by the drive aggregates it produces control signals for operating the clutch in a slip operating mode.

* * * * *

UNITED STATES PATENT AND TRADEMARK OFFICE
CERTIFICATE OF CORRECTION

PATENT NO.         : 8,494,739 B2  
APPLICATION NO. : 12/736369  
DATED              : July 23, 2013  
INVENTOR(S)        : Jens-Werner Falkenstein Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Fifteenth Day of September, 2015

Michelle K. Lee
*Director of the United States Patent and Trademark Office*